US012450960B2

(12) United States Patent
Basir

(10) Patent No.: US 12,450,960 B2
(45) Date of Patent: Oct. 21, 2025

(54) RECORDING AND REPORTING OF DRIVING CHARACTERISTICS WITH PRIVACY PROTECTION

(71) Applicant: Appy Risk Technologies Limited, Waterloo (CA)

(72) Inventor: Otman A. Basir, Waterloo (CA)

(73) Assignee: Appy Risk Technologies Limited

( * ) Notice: Subject to any disclaimer, the term of this patent is extended or adjusted under 35 U.S.C. 154(b) by 0 days.

(21) Appl. No.: 18/226,032

(22) Filed: Jul. 25, 2023

(65) Prior Publication Data
US 2024/0119768 A1 Apr. 11, 2024

Related U.S. Application Data

(63) Continuation of application No. 12/598,254, filed as application No. PCT/CA2008/000860 on May 2, 2008, now abandoned.

(60) Provisional application No. 60/915,592, filed on May 2, 2007.

(51) Int. Cl.
| | |
|---|---|
| *G07C 5/08* | (2006.01) |
| *G06Q 10/04* | (2023.01) |
| *G06Q 30/02* | (2023.01) |
| *G06Q 40/08* | (2012.01) |
| *G07C 5/00* | (2006.01) |

(52) U.S. Cl.
CPC ........... *G07C 5/0858* (2013.01); *G06Q 10/04* (2013.01); *G06Q 30/02* (2013.01); *G06Q 40/08* (2013.01); *G07C 5/008* (2013.01)

(58) Field of Classification Search
CPC ...... G07C 5/0858; G07C 5/008; G06Q 10/04; G06Q 30/02; G06Q 40/08
See application file for complete search history.

(56) References Cited

U.S. PATENT DOCUMENTS

| | | | |
|---|---|---|---|
| 7,667,618 B2 | 2/2010 | Chitor et al. | |
| 8,456,274 B2 | 6/2013 | Modiano | |
| 10,380,691 B1* | 8/2019 | Smith | ................... G06Q 40/08 |
| 2004/0181495 A1 | 9/2004 | Grush | |
| 2009/0024458 A1 | 1/2009 | Palmer | |
| 2011/0218896 A1 | 9/2011 | Tonnon et al. | |
| 2013/0031029 A1 | 1/2013 | Davidson | |
| 2017/0161859 A1* | 6/2017 | Baumgartner | ..... G06Q 30/0202 |
| 2017/0316510 A1* | 11/2017 | Hertz | ................. G06Q 30/0283 |
| 2018/0170374 A1* | 6/2018 | Otsuka | ............. B60W 30/0956 |

(Continued)

FOREIGN PATENT DOCUMENTS

| | | |
|---|---|---|
| EP | 1583038 A1 | 10/2005 |
| EP | 2017790 A2 | 1/2009 |

(Continued)

*Primary Examiner* — Hussein Elchanti
(74) *Attorney, Agent, or Firm* — Carlson, Gaskey & Olds, P.C.

(57) ABSTRACT

In a vehicle usage monitoring system, the privacy of the user is protected by performing some coding prior to sending the information from the user. Specific details of the user's driving history are converted to generalized codes that relate to insurance rates. Optionally, different types of vehicle information may be combined into generating the codes to be sent from the user in order to provide even more privacy. The codes may be used to calculate a vehicle insurance rate.

14 Claims, 4 Drawing Sheets

(56) References Cited

U.S. PATENT DOCUMENTS

2019/0120641 A1* 4/2019 Dong ................. G01C 21/3697
2019/0293772 A1* 9/2019 Pfeiffer ................ G05D 1/0088

FOREIGN PATENT DOCUMENTS

| FR | 2969357 A1 | 6/2012 |
| JP | 2011128680 A | 6/2011 |

* cited by examiner

RECORDING AND REPORTING OF DRIVING CHARACTERISTICS WITH PRIVACY PROTECTION

BACKGROUND OF THE INVENTION

This invention relates to a device and method for recording driving characteristics and diagnosing a condition of the device. More particularly, this invention relates to a method and device for recording driving characteristics utilized to monitor and compile vehicle usage data and diagnosing device condition for determining an insurance premium.

Some vehicle insurance currently determines price based upon information gathered by in-vehicle sensors that indicate where the vehicle was driven, how fast the vehicle was driven, times of day and days of the week, etc.

There are some concerns that the amount of detailed information that is given to the insurance companies with these types of systems intrudes on the privacy of the users.

SUMMARY OF THE INVENTION

In one example embodiment of the present invention, the privacy of the user is protected by performing some coding prior to sending the information from the user. Specific details of the user's driving history are converted to generalized codes that relate to insurance rates. Optionally, different types of vehicle information may be combined into generating the codes to be sent from the user in order to provide even more privacy.

DETAILED DESCRIPTION OF THE PREFERRED EMBODIMENT

Figure 1:
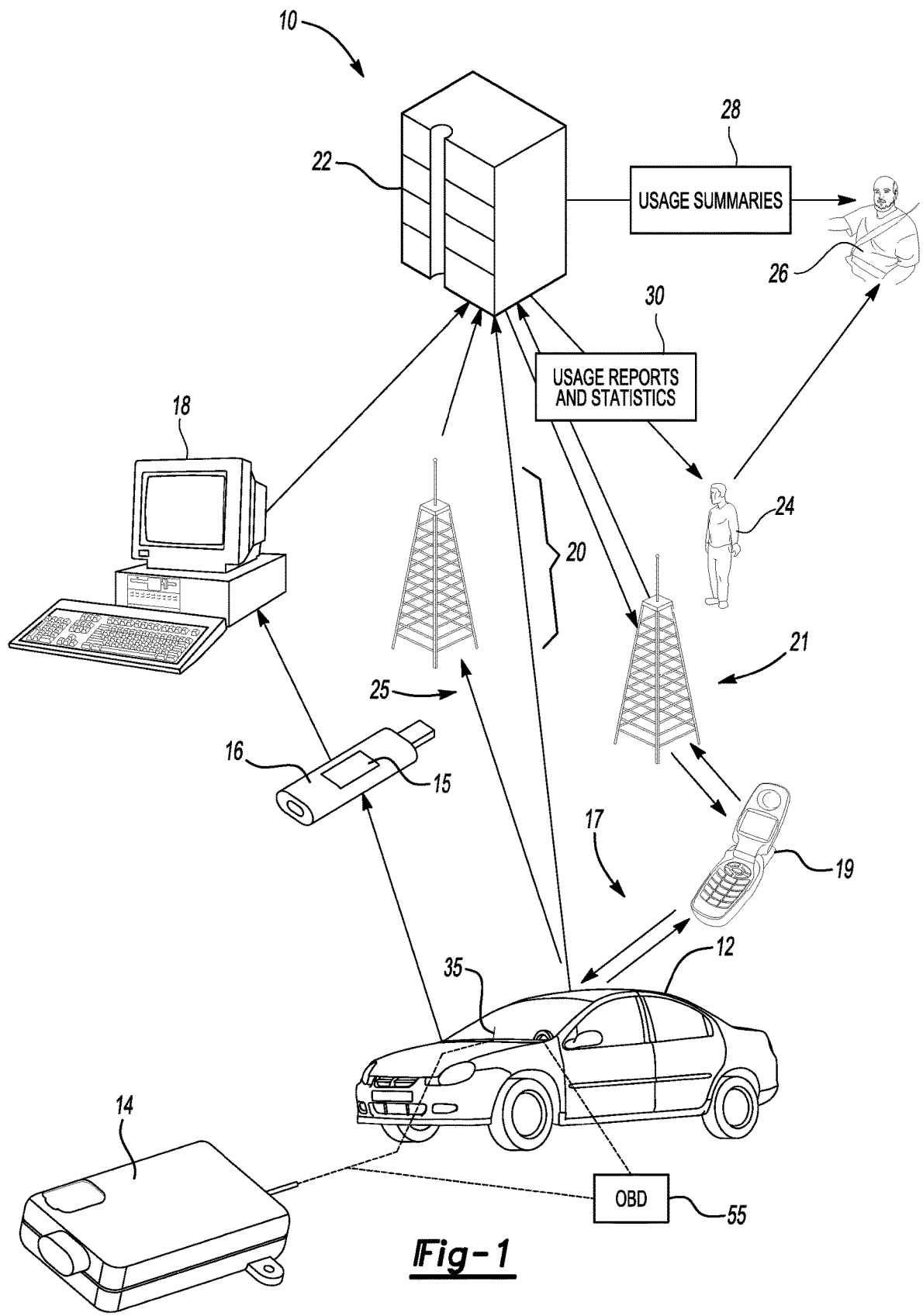
FIG. 1 is a schematic representation of an example system and process for gathering vehicle usage data.

Referring to FIG. 1, a schematic representation of the system 10 is shown and includes a cradle 14 for installation within a vehicle 12. The cradle 14 is installed within the vehicle 12 preferably in a location that is easily accessible yet not in plain view such as to cause an obstruction to the operator. Preferably, the cradle 14 will be installed underneath an instrument panel or within a glove compartment. The cradle 14 is attached and connected to receive power from a vehicle power source. Power from the vehicle can originate from a non-switched fuse box, OBD-II port, or other powered connection within the vehicle 12 as known.

A memory device provides for the extraction of data gathered and stored within the cradle 14. The memory device illustrated is a USB data key 16 that is insertable and removable from the cradle 14. The USB data key 16 receives information that is compiled from the cradle 14 for subsequent analysis. In the example embodiment, the USB data key 16 is removed and communicates with a personal computer 18. The vehicle user removes the USB data key 16 in response to a triggering event such as a lapse of time and downloads the information into the personal computer 18. The information is then transmitted via the Internet or other data communication link to a central server 22. The central server 22 interprets the information and generates summary 28 and usage reports 30.

The summary 28 may be reviewed by an operator 26 and insurance provider 24 and can contain any desired combination of information gathered by the cradle 14. The reports 30 for the insurance provider may include more directed and focused usage information directly focused for determining an insurance premium tailored to the specific operator 26. The data key 16 may also include a microprocessor 15 that enables separate execution of software instructions independent of a personal computer 18.

The data key 16 can include a code or other instructions that pairs the data key 16 with a specific vehicle 12 or with the specific cradle 14 disposed within the vehicle. The paired nature of the data key 16 to the cradle 14 provides for the prevention of unauthorized use or download of information from other data keys from other vehicles.

Data that is saved to the data key 16 is encrypted to prevent the unauthorized modification by a user or other individual. The encrypting is provided to prevent modification of any data stored on the data key 16 such that data stored on the data key 16 can be assured to be actual data indicative of vehicle operation. The data key 16 includes programming that provides information and programming that can discern whether the data key 16 is connected to the cradle 14 within the vehicle or that it is connected to a personal computer 18. If connected to a personal computer 18, programming and encryption prevent unauthorized manipulation of stored data.

FIG. 1 shows an example transmission method where the cradle 14 directly transmits by way of a wireless link 20 to the central server 22. This provides for the automatic transmission of data indicative of vehicle usage directly to the central server 22 without requiring operator intervention or action. Such a wireless transmission link streamlines data acquisition and processing at the central server 22. Further, automatic and direct transmission of vehicle usage information can substantially eliminate potential data integrity and verification issues that may arise with the involvement of the operator 26.

Another means for communicating information gathered by the cradle 14 to the central server 22 is through a Bluetooth connection 17 with a cellular communication device, such as for example a phone 19. The Bluetooth connection 17 between the phone 19 and the cradle 14 facilitates communication through a cellular phone network 21 to the central server 22. The phone 19 includes a resident program that directs the receipt and forwarding of data from the cradle 14 to the central server through the Bluetooth connection 17.

The wireless link may also include a connection by way of a local area WiFi link 25 as is known. The wireless link can include any known low frequency transmission format. Further, the path of the transmission may include other paths as are known, not simply those that are illustrated. As appreciated, many different wireless networks or methods of utilizing wireless networks can be utilized to upload vehicle operation data.

Figure 2:
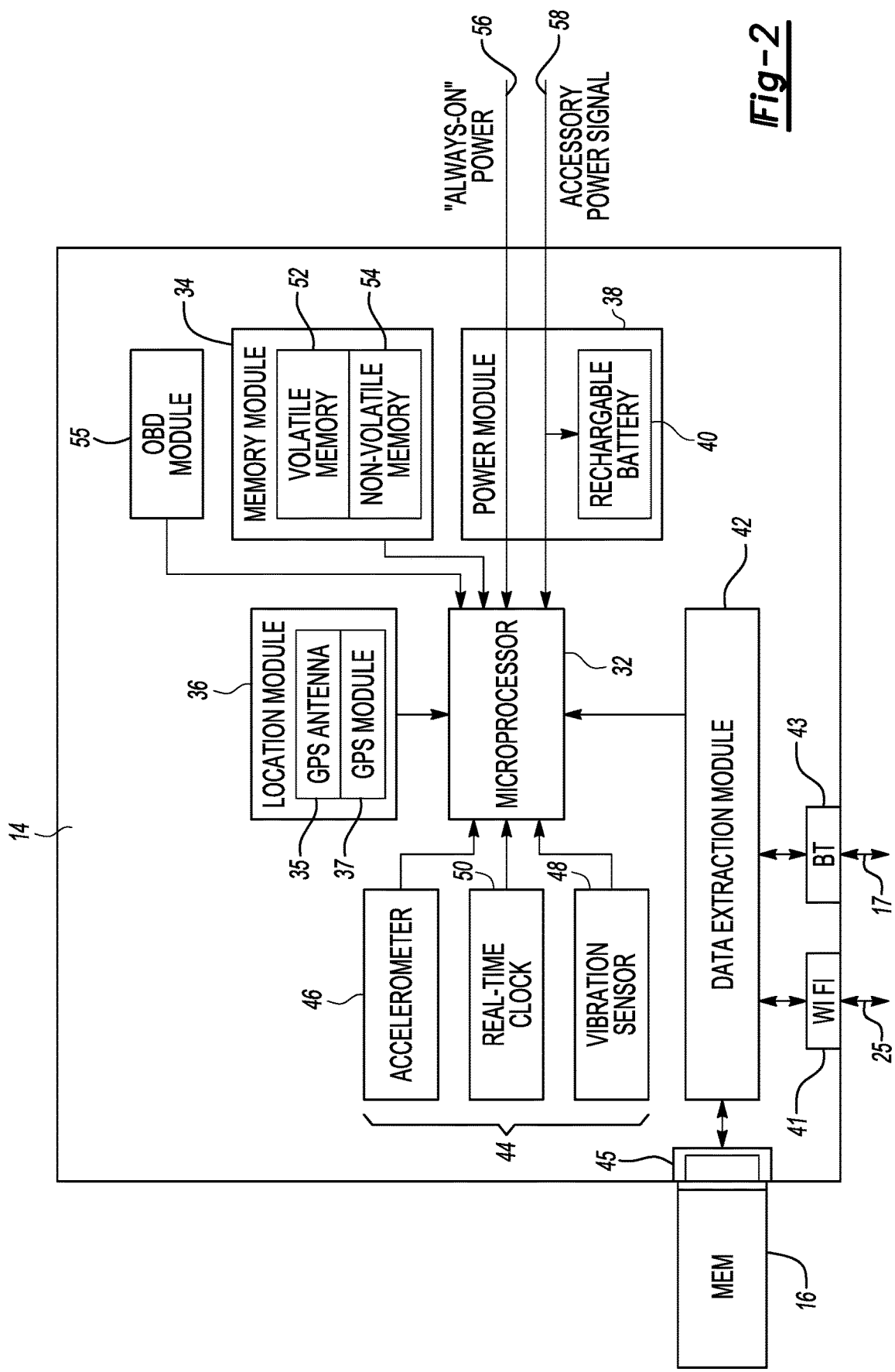
FIG. 2 is a block diagram of an example device for gathering and compiling vehicle usage data.

Referring to FIG. 2, the cradle 14 is shown schematically and includes a memory module 34, a power module 40, a location module 36 and a sensor module 44. Each of these modules is in communication with a microprocessor 32. The microprocessor 32 communicates with the various modules to receive data and other information as required.

The memory module 34 includes a volatile memory 52 and a non-volatile memory 54. Data is stored in the memory module 34 as directed by the microprocessor 32 until transmission to the central server 22.

The power module 40 is preferably connected to an always-on vehicle power source 56. Further, the power module includes a connection to an accessory power signal 58 that provides an indication that the vehicle ignition is on. The cradle 14 is powered by power from the vehicle 12. The power module 38 includes a rechargeable battery 40 for operation in circumstances where vehicle power is not provided to the cradle 14. This allows the cradle 14 to operate in some capacity when the vehicle power source is not properly providing power.

The power module 38 provides continuous main power from the vehicle's main battery source. In the disclosed example, power is accessed from a non-switched fuse panel, OBD-II or other vehicle power connection location. To ensure that during periods when power is disconnected, the rechargeable battery 40 is able to maintain system critical functionality. In other words, some power is always provided to the cradle 14 such that minimal functions can always be performed. As appreciated, although a rechargeable battery 40 is shown and described, standard non-rechargeable batteries are also within the contemplation for use in providing an alternate and independent power supply to the cradle 14.

The sensor module 44 includes an accelerometer 46 for determining an acceleration or deceleration of the vehicle 12. The accelerometer is preferably capable of measuring acceleration in three axes; however, any accelerometer known in the art is within the contemplation of this invention. Measuring acceleration provides a good indication of driving habits of the operator 26. Frequent hard braking and hard acceleration can be indicators of operator driving habits. Further, hard cornering is also detected by the accelerometer 46 and provides information indicative of an operator's driving habits.

A real time clock 50 provides the time for several purposes including providing a determination of the time of day in which the vehicle is operating. The clock 50 allows the determination of trends of vehicle usage. Further, the clock 50 is utilized to determined the amount of time the vehicle is used, per-day and over the enter data acquisition period.

The vibration sensor 48 provides an indication as to whether the vehicle is moving or not in the absence of power from the vehicle itself. This provides a validation function to determine if the lack of power from the vehicle is truly indicative of the vehicle not operating or if the vehicle is moving without powering the cradle 14.

The localization module 36 includes an antenna 35 and a global positioning system module 37. The antenna 35 receives signals from satellites to determine a location of the cradle 14, and thereby the vehicle with regard to a specific longitude and latitude. The position information provides for the determination of the places in which the vehicle is being utilized. Positional information provides for the determination of several valuable types of information including time within a specific geographic region in which a vehicle is operating. Further, the location module provides information that is utilized to determine how much time a vehicle is used within a specific defined region such as a postal code, city or town limit. The system may even provide information as to the type of road the vehicle is used on, for example surface streets or on an expressway.

The GPS module 37 also provides an alternate means of gathering vehicle acceleration information in the absence of data from the accelerometer. The positional information provided by the GPS module 37 over time provides for the determination of vehicle acceleration in two axes in the event that the sensor module 44 and thereby information from the accelerometer 46 is not available. Additionally, acquisition of time measurements can be facilitated through the GPS module 37 in the event that communication with the real time clock 50 is not available.

The Bluetooth connection 17 is alternatively utilized in concert with the GPS module 37 to provide a means of remotely obtaining location information of the vehicle. The central server 22 can call the phone 19 associated with the cradle 14 and upload location information obtained by the GPS module 37. The upload of location information can be triggered remotely by the central server 22 by contacting the phone 19 that in turn through the Bluetooth 17 link will obtain information on the location of the vehicle. This information is then communicated back over the cellular connection 21 to the central server 22. Further, the communication between the phone 19, the central server 22 and the cradle 14 provides for real-time location and tracking of a vehicle. The real-time tracking can be triggered according to a desired schedule, or in response to a specific triggering event.

Further, the resident program within the phone 19 can be utilized to periodically trigger communication as desired to provide an alternate method of uploading information from the cradle 14 to the central server 22. An operator can be provided with the option to accept or reject communication. Such communication can also be delayed to provide for operation of the phone by the operator as desired. As appreciated, many different triggering events and schedules can be instituted utilizing the Bluetooth communication link 17 to provide desired data on vehicle operation and location.

The cradle 14 includes instructions that are utilized in the event of a blackout of the GPS system. As appreciated, some areas or other conditions may be blacked out from GPS signals required to determine a position. An example embodiment includes provisions for compensating for such blackouts. During such a blackout the cradle utilizes the last known GPS position along with speed and direction data gathered from other system to determine a general location. The general location determined independent of the GPS system is not as accurate, but can provide information as to the general geographic location. The general geographic location is determined from the available vehicle information that is indicative of vehicle direction and speed. As appreciated, such a system can be utilized when the geographic nature of the area such as a tunnel or mountains prevent a clear GPS signal.

Further, the vehicle speed and direction information can be utilized in conjunction with the next GPS signal such that the path of the vehicle 12 can be orientated utilizing the two separate GPS signals along with the intervening information indicative of vehicle speed and direction.

The cradle 14 includes a data extraction module 42 for the transmission and removal of data from the cradle 14. The example data extraction module 42 includes a USB port 45 for communication with a removable data storage device such as the USB key 16. The example data extraction module 42 may also comprise a wireless transmission device for sending a transmission to a receiver station and subsequently to the central server 22.

The wireless communication can include a wireless USB, an infrared signal or other known wireless transmission device. The data extraction module 42 may also include a carrier based wireless transmission device. The example data extraction module 42 communicates with a WiFi module 25 for communicating information to a WiFi network.

Further, the data extraction module 42 can include a peer-to-peer wireless transmission where an intermediate receiver station receives the peer-to-pear communication and passes it onto the central server 22 by a wireless or wired connection. The data extraction module 42 is also in communication with a Bluetooth module 17 for communicating with other Bluetooth enabled devices. Further, communication can then be enabled through a Bluetooth device such as the phone 19 through a cellular communications network 21.

The data extraction module 42 may also comprise a data modem transmission device that is attachable to a download station. The data extraction module 42 would comprise in such an embodiment a serial or other connection interface for attachment to a modem or other known connection or port.

Figure 3:
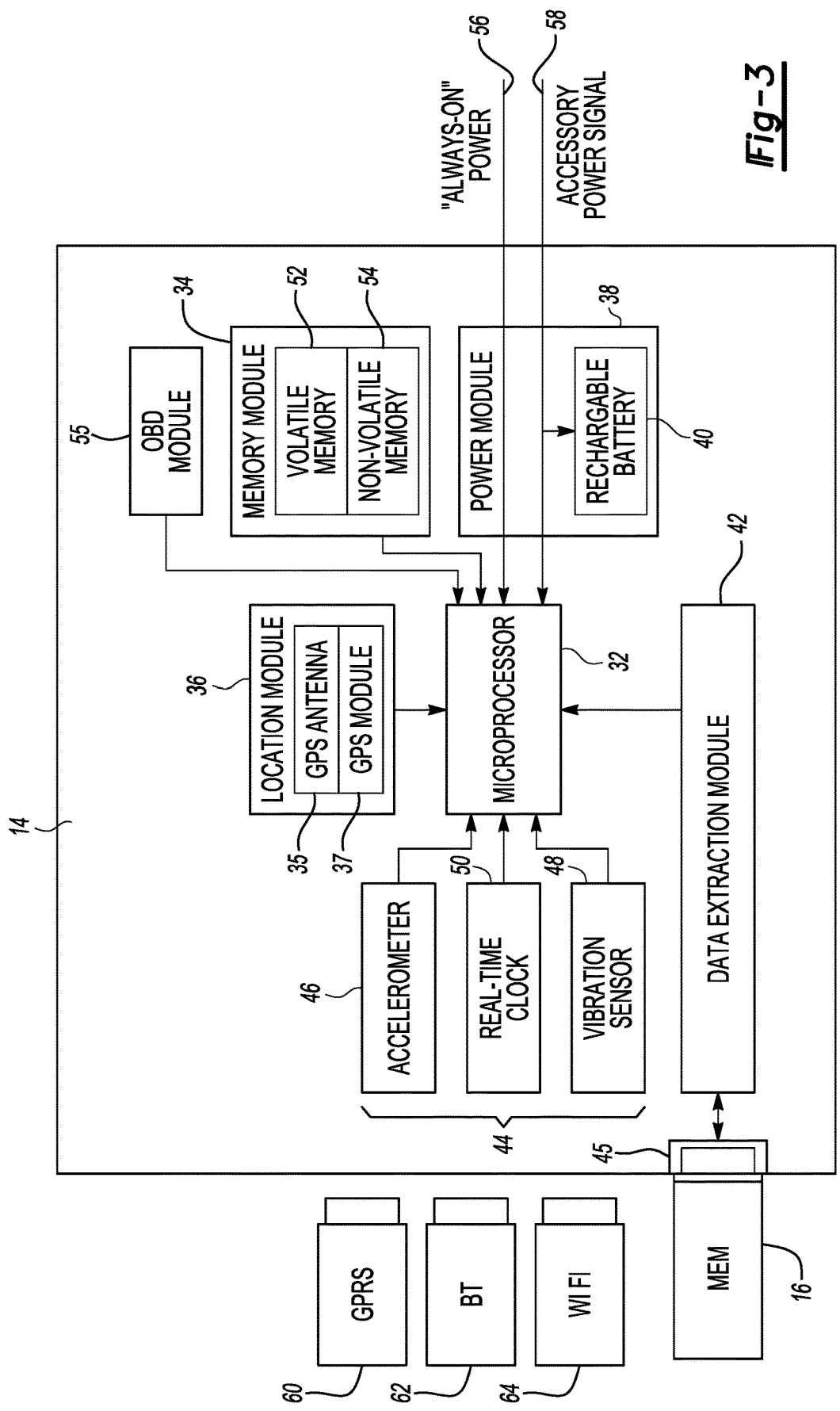
FIG. 3 is a block diagram of another example device gathering and compiling vehicle usage data.

Referring to FIG. 3, another example cradle 14A includes a data extraction module 42A with only the USB port 45. The USB port 45 can accept various modules along with the data key 16. The various modules can include a WiFi module 64, a Bluetooth module 62 and a general packet radio signal (GPRS module 60. A user determines the method of transmitting or uploading data by the type of module plugged into the USB port 45. Accordingly, plugging in the GPRS module 60 provides for the transmission of data through an applicable wireless link. Similarly, the Bluetooth module 62 and WiFi modules 64 plugged into the USB ports 45 provide different wireless links for receiving and uploading data.

Once data has been extracted from the cradle 14 it may be viewable through the personal computer 18. Typically, viewing on a personal computer 18 is accomplished by utilizing the data key 16. The information once downloaded from the data key 16 via the personal computer 18 could then be transmitted to the central server 22 where the data could be compiled for viewing and a determination of insurance premiums. Further, initial viewing of information on the personal computer 18 would afford a user an opportunity to review the data prior to submission to an insurance provider. The operator could then determine if the data is indicative of actual vehicle usage and if submission of the data would be beneficial to the user for reducing insurance premiums.

Another use of the gathered data by a user at the personal computer 18 is to analyze vehicle operating parameters and performance such as fuel mileage, performance, braking operation and driving performance. As appreciated, the fuel mileage is easily determined by providing information indicative of current and actual fuel levels 14. This information can be utilized by an operator or fleet manager to determine and monitor operation of the vehicle.

In the example embodiment, data is extracted from the cradle 14 and transmitted to the central server 22 by way of the USB key 16 and personal computer 18. Once the data is extracted and transmitted to the central server 22, this data can be consolidated into reports and summaries for the user and insurance provider.

During normal operation the localization module 36 provides vehicle position in longitude and latitude. The vehicle position is utilized to determine vehicle heading, speed and other information indicative of a vehicle position. Further, combination of the known longitude and latitude of the vehicle with geographic divisions such as postal codes, zip codes, governmental division such as cities or towns can be utilized to determine the amount of usage of a vehicle within a given area. As is appreciated insurance premiums are based in large part on the actual time, location and operation of the vehicle.

The use of the localization module 36 provides a means for gathering meaningful data on the time, position and operating location of a vehicle. The operational position of a vehicle can be correlated with geographic limits to determine a time in each of the divisions.

Figure 4:
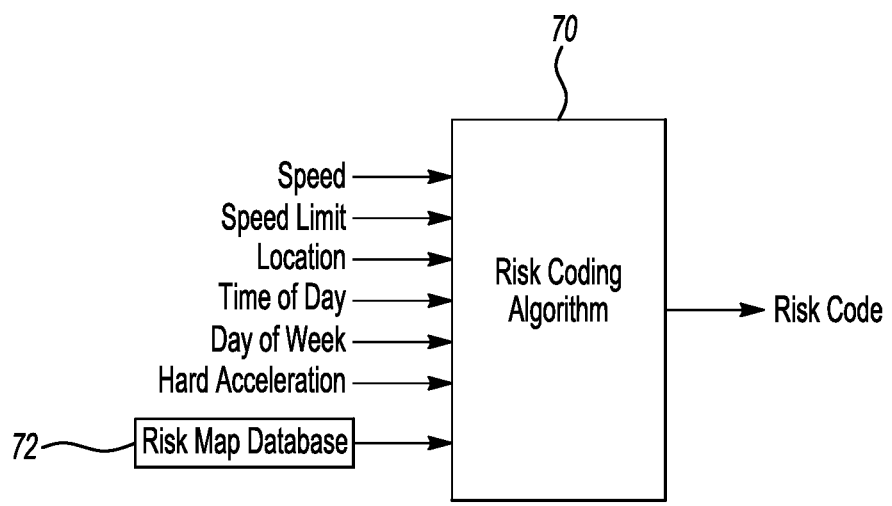
FIG. 4 is a schematic representation of the risk-coding system and process used in the systems of FIGS. 1-3.

For the embodiments of FIG. 2 or 3, the vehicle operation characteristics are gathered and sent as shown in FIG. 4. Generally, the risk-coding algorithm 70 receives the vehicle information, such as vehicle location (as determined by GPS or other sensors, such as by the cell towers triangulating the location of the mobile device 19), vehicle speed, current speed limit (as determined for the current vehicle location from a map database of speed limits), time of day, day of the week, hard accelerations (including hard braking), etc. The risk-coding algorithm 70 could be performed on the server 22 (after which, the underlying data is discarded), on the cradle 14 or in the user's computer 18 prior to transmission to the server 22.

A risk map database 72 includes risk ratings for a plurality of geographical areas (e.g. zip codes). The risk map database 72 may include more than one risk rating for each geographical area, such that different risk ratings are applicable for different times of day or days of the week. The risk rating mapping is many to one, meaning that many different geographical areas will have the same risk rating.

In a simplest example, the risk code generated by the risk-coding algorithm could be based solely on time spent in each geographical area and the associated risk ratings for those geographical areas. The risk code could be simply an indication of how much time (or what times of day) the vehicle was in areas of certain risk ratings. For example, the risk code could indicate that the vehicle was in a zone of risk rating 4 between 4:00 and 5:00, in a zone of risk rating 10 between 5:00 and 5:35, and in a zone of risk rating 1 between 5:35 and 6:00. This resultant risk code information could be used by the insurance company to determine insurance rates, while preserving some privacy for the user. Because the risk ratings are many-to-one, it is not possible to determine exactly where the user was during these times.

In another example, additional information, such as speed (or speed as compared to current speed limit), time of day, day of the week, hard acceleration information, etc. could all be input into the risk-coding algorithm 70. The durations of each condition affecting insurance cost are also used in the risk-coding algorithm 70. The resultant risk code output is simply an associated insurance cost factor. The insurance cost charged to the user for the vehicle is then determined by the server 22 as a function of the risk code and optionally any other permanent information stored on the server 22 (such as the user's age, the type of vehicle, the user's driving record, etc). By combining several different types of information in the risk-coding algorithm 70 prior to sending the risk code to the server 22 (or, if calculated on the server 22, prior to storing on the server 22 and discarding the underlying data), the specific information that may intrude on the user's privacy is obscured.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers for steps in method claims are for ease of reference in dependent claims and do not signify a required sequence unless otherwise stated.

What is claimed is:

1. A device for gathering and analyzing vehicle usage data:

at least one sensor for determining at least one vehicle operation characteristic of the vehicle, wherein the at least one sensor includes a GPS sensor and an accelerometer;

at least one processor receiving a vehicle location from the GPS sensor and acceleration information from the accelerometer, the at least on processor programmed to generate at least one code based upon the vehicle location over time and based upon the acceleration information over time and based upon a geographic risk code map in which a plurality of noncontiguous geographic areas have a same risk code associated therewith, wherein the at least one code at least partially obscures the at least one vehicle operation characteristic to protect privacy of a user of the vehicle, wherein the at least one processor generates the at least one code using a risk-coding algorithm that receives the at least one vehicle operation characteristic and generates the at least one code based upon a risk map database including risk ratings for a plurality of geographical areas, wherein the risk ratings are mapped in a many-to-one manner such that multiple noncontiguous geographical areas share the same risk rating to obscure the location and prevent reverse-engineering of the at least one vehicle operation characteristic, wherein the at least one vehicle operation characteristic includes a plurality of vehicle operation characteristics including vehicle speed compared to a current speed limit for the location, time of day, day of the week, and acceleration data, and wherein the at least one processor discards the at least one vehicle operation characteristic after generating the at least one code to prevent storage or transmission of raw data, wherein the at least one code indicates risk codes associated with each of the geographic areas where the vehicle was present without indicating the geographic areas; and a wireless transmitter, wherein the at least one processor is programmed to transmit the at least one code but not the vehicle location or acceleration information via the wireless transmitter.

2. The device of claim 1 wherein the at least one processor is on the vehicle.

3. The device of claim 1 wherein the at least one processor is on a server remote from the vehicle and wherein the server discards the at least one vehicle operation characteristic after generating the code.

4. The device of claim 1 wherein the at least one sensor includes a GPS receiver.

5. The device of claim 1 wherein the at least one sensor includes a cell transceiver device.

6. The device of claim 1 further including a vibration sensor, wherein the at least one processor is configured to determine whether the vehicle is moving based upon a signal from the vibration sensor.

7. The device of claim 1 in combination with a phone programmed to periodically initiate transmission of the at least one code from the at least one processor.

8. The device of claim 1 further including a battery powering the at least one processor.

9. The device of claim 8 wherein the at least one processor is configured to receive power from the vehicle and to be powered by the battery when the at least one processor does not receive power from the vehicle.

10. A method of recording and reporting vehicle usage comprising:

monitoring vehicle location over time;

on the vehicle, generating at least one code with a processor based upon the monitored vehicle location over time based upon a geographic risk code map, wherein the geographic risk code map has a first plurality of noncontiguous geographic areas each have a first risk code associated therewith and in which a second plurality of noncontiguous geographic areas each having a second risk code associated therewith, wherein the first risk code is different from the second risk code, such that driving in any of the first plurality of noncontiguous geographic areas would generate the first risk code, such that driving in any of the second plurality of noncontiguous geographic areas would generate the second risk code, and such that it cannot be determined from the first risk code which of the first plurality of noncontiguous geographic areas was the monitored vehicle location, and such that it cannot be determined from the second risk code which of the second plurality of noncontiguous geographic areas was the monitored vehicle location, and wherein the at least one code is generated in part based upon actions by a driver of the vehicle such that it cannot be determined whether the monitored vehicle location was in one of the first plurality of noncontiguous areas or one of the second plurality of noncontiguous areas, and wherein the at least one code is generated in part based upon an amount of time spent in the first plurality of noncontiguous areas and in part based upon an amount of time spent in the second plurality of noncontiguous areas, wherein the at least one code is generated using a risk-coding algorithm that receives a plurality of vehicle operation characteristics including the vehicle location over time, vehicle speed compared to a current speed limit for the location, time of day, day of the week, and acceleration data, and generates the at least one code based upon a risk map database including risk ratings for a plurality of geographical areas, wherein the risk ratings are mapped in a many-to-one manner such that multiple noncontiguous geographical areas share the same risk rating to obscure the location and prevent reverse-engineering of the at least one vehicle operation characteristic, wherein the at least one code at least partially obscures the plurality of vehicle operation characteristics to protect privacy of a user of the vehicle, and wherein the processor discards the plurality of vehicle operation characteristics after generating the at least one code to prevent storage or transmission of raw data; and transmitting the at least one code to a server without transmitting the monitored vehicle location, wherein the transmitted at least one code does not indicate the geographical areas, wherein the at least one code enables the server to determine an insurance cost based upon the at least one code without reference to the discarded plurality of vehicle operation characteristics.

11. The method of claim 10 wherein the at least one code is further generated based upon days of the week.

12. The method of claim 10 wherein the at least one code is further generated based in part upon acceleration information from an accelerometer in the vehicle.

13. The method of claim 12 wherein the at least one code is further based upon a speed of the vehicle.

14. The method of claim 10 further including receiving a signal from a vibration sensor and determining that the vehicle is moving based upon the signal from the vibration sensor.

* * * * *